March 1, 1932. G. N. WILLIAMS 1,847,155
MACHINE FOR SECURING WIRE FABRIC TO GATE FRAMES
Filed July 23, 1931 12 Sheets-Sheet 1

Inventor:
George N. Williams

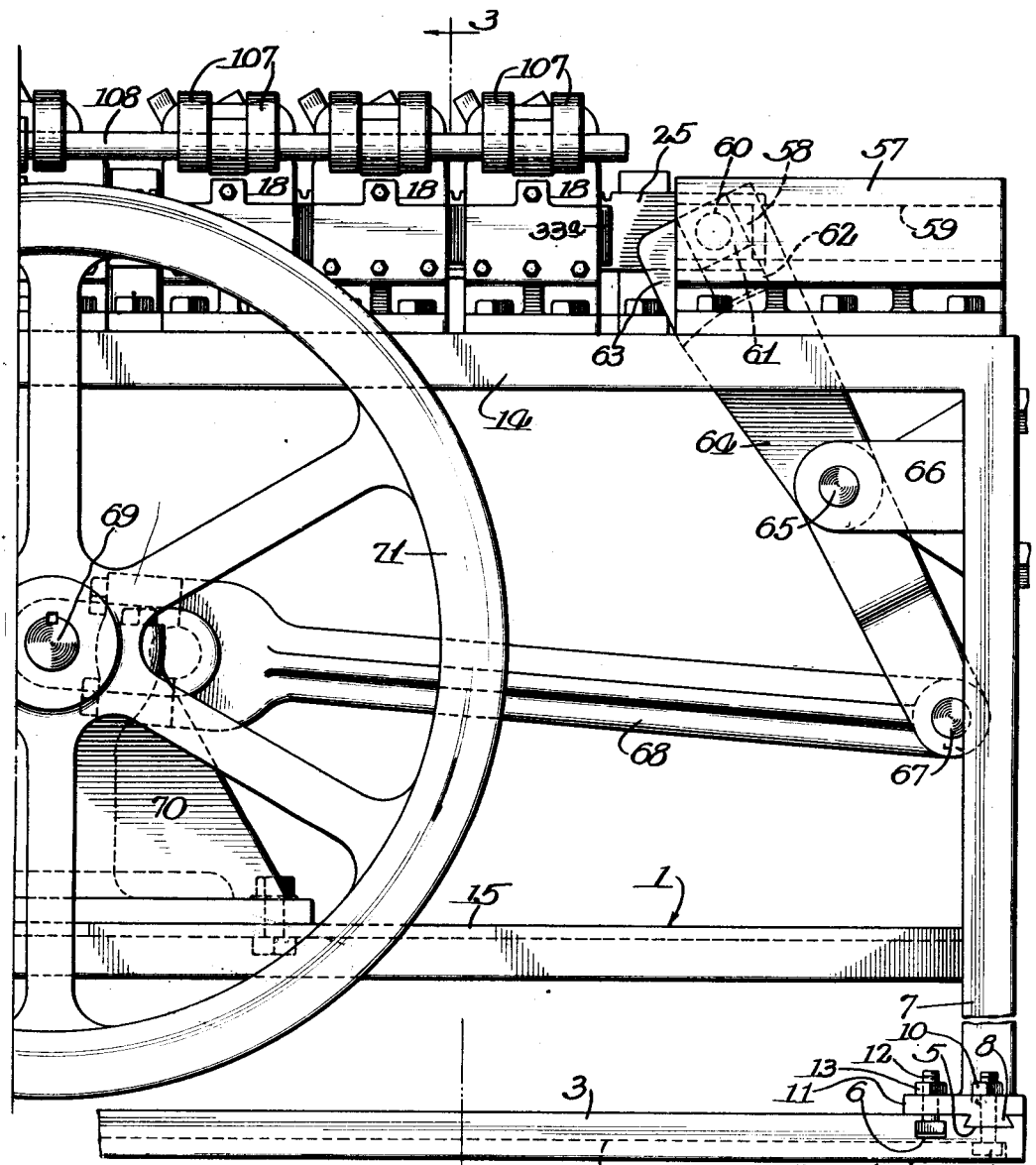

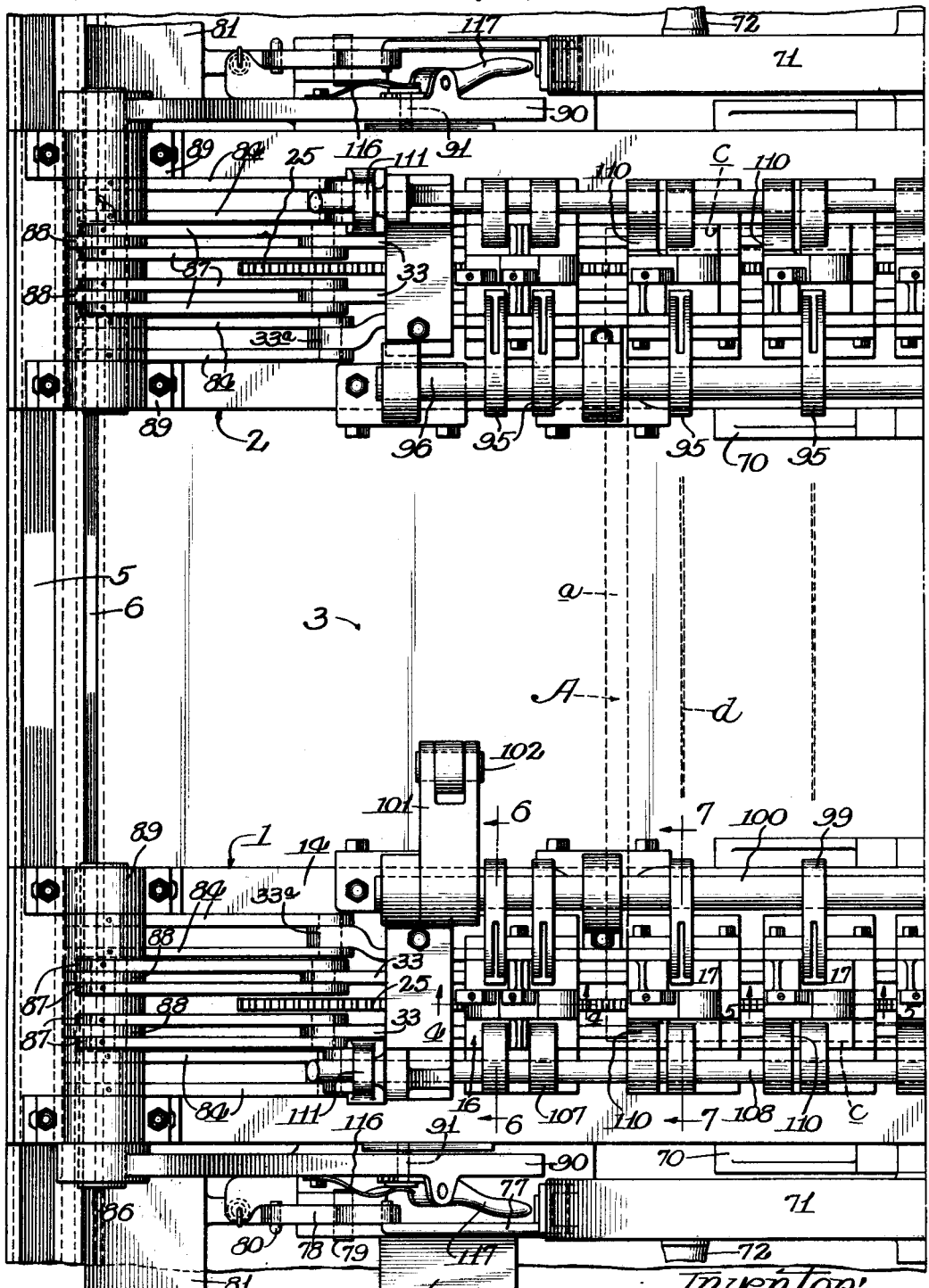

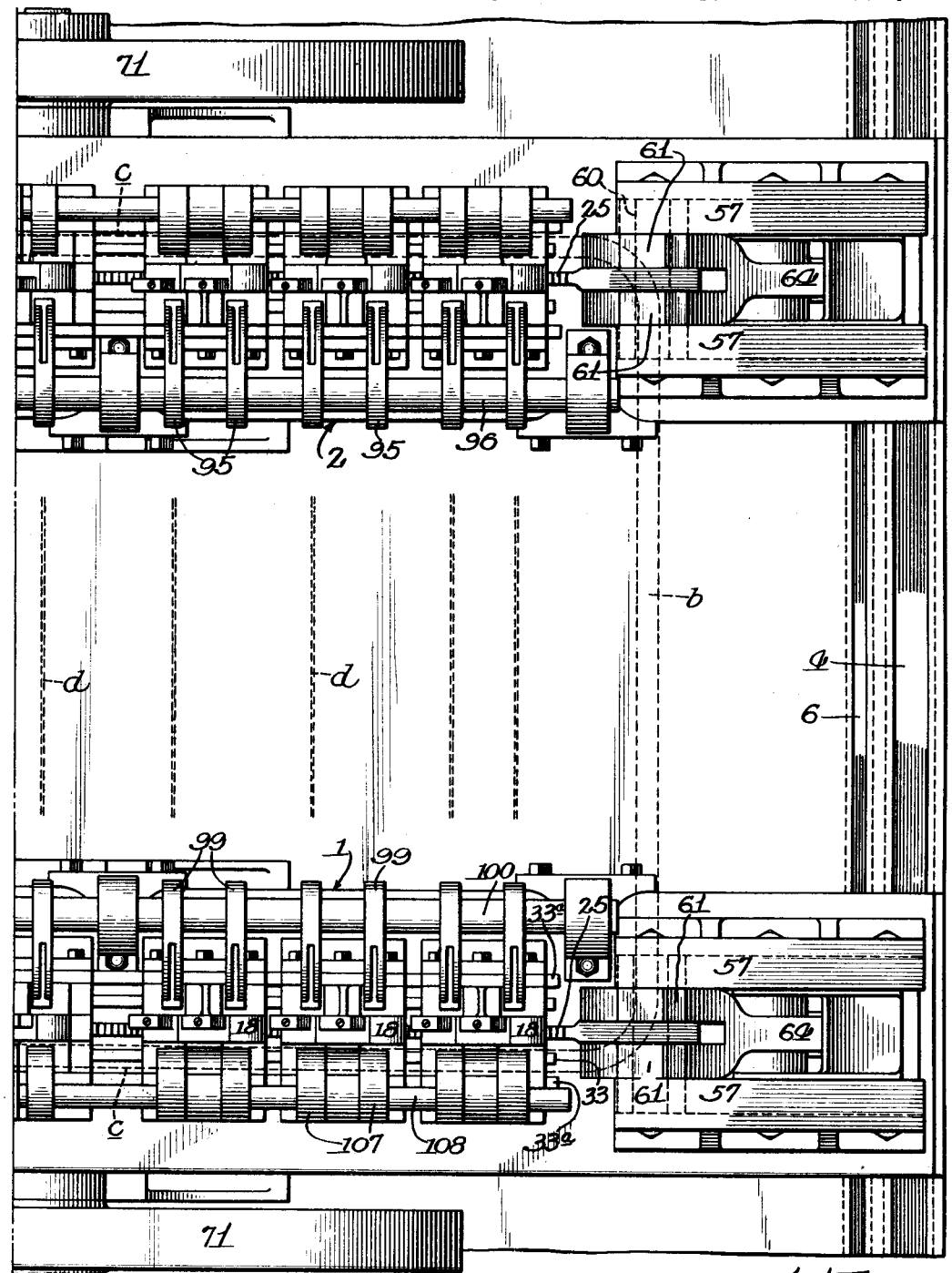

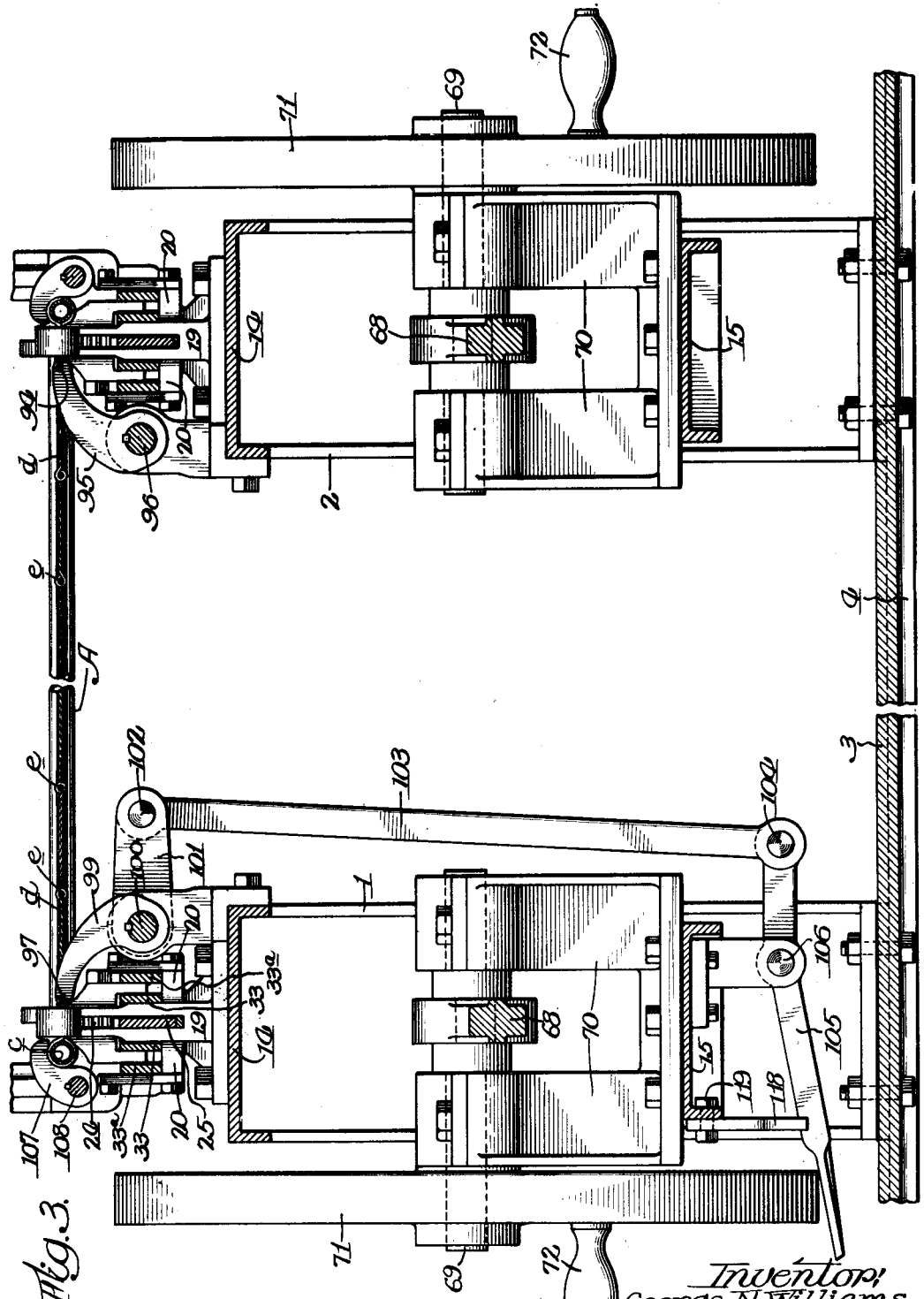

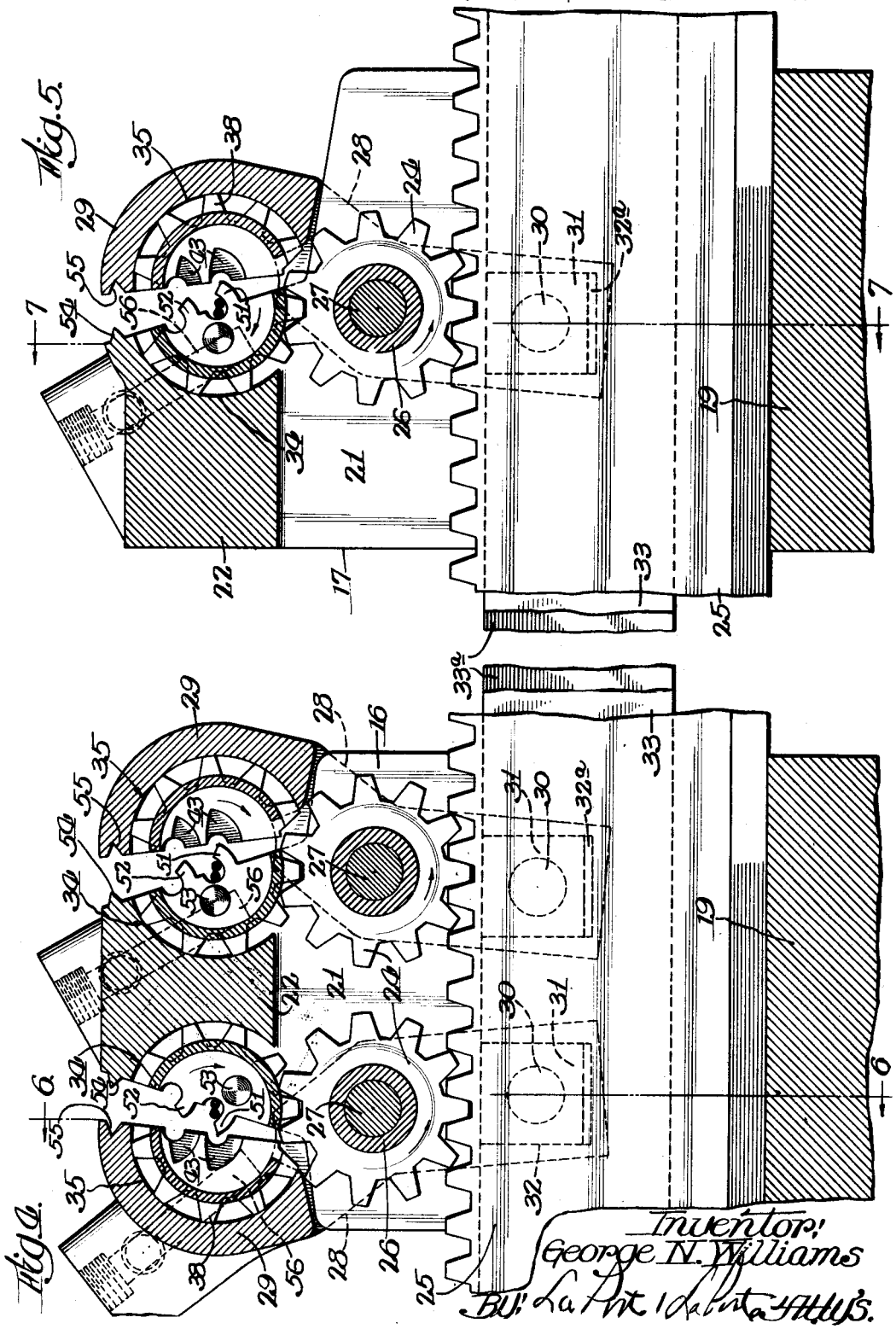

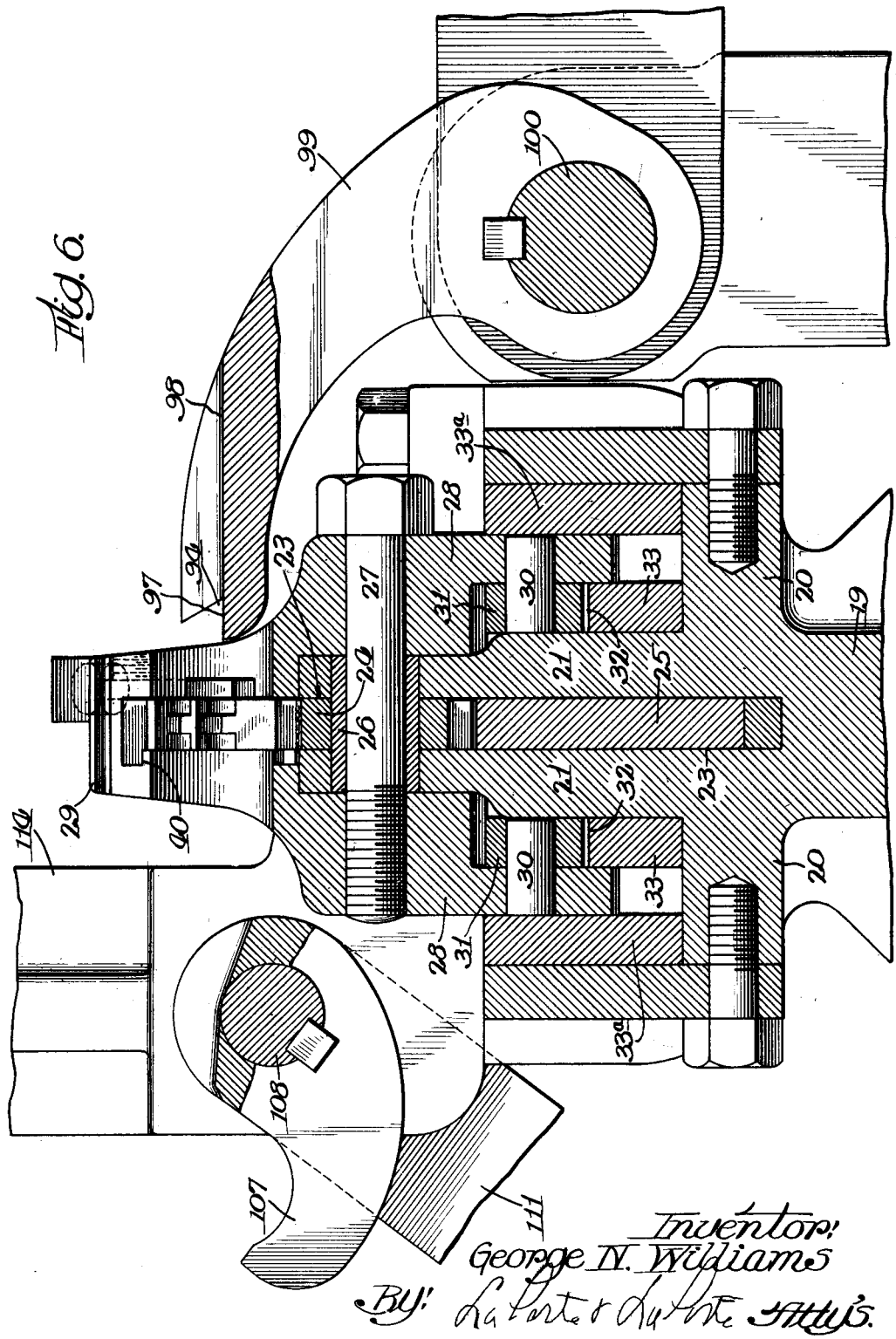

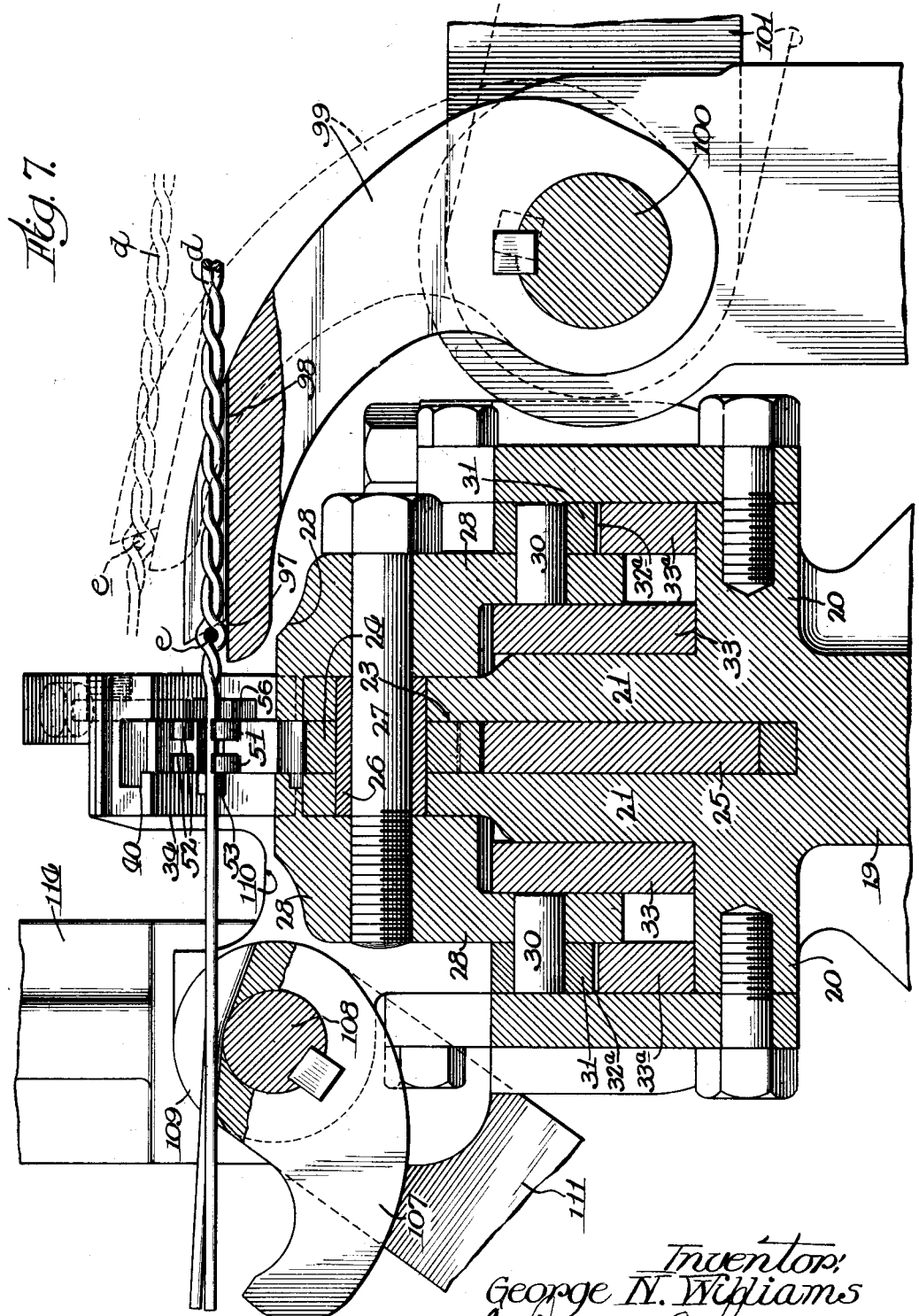

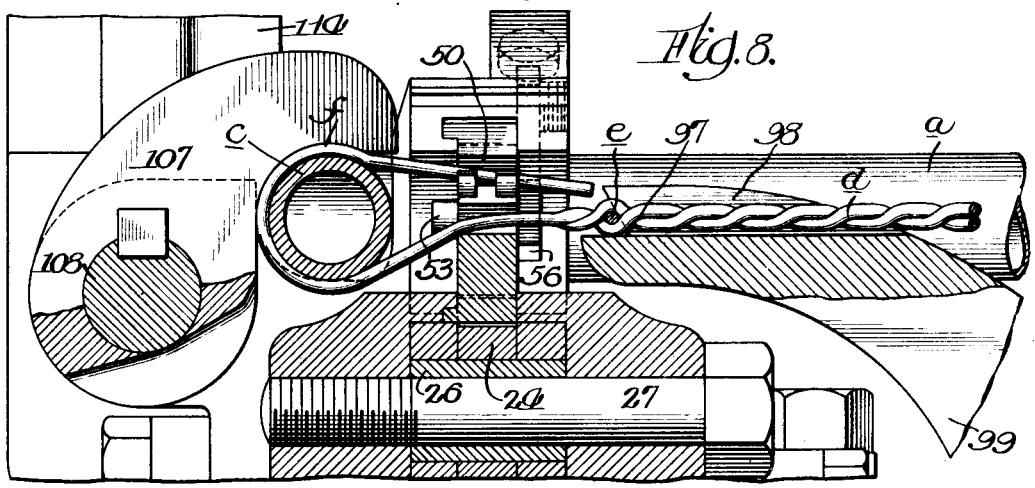
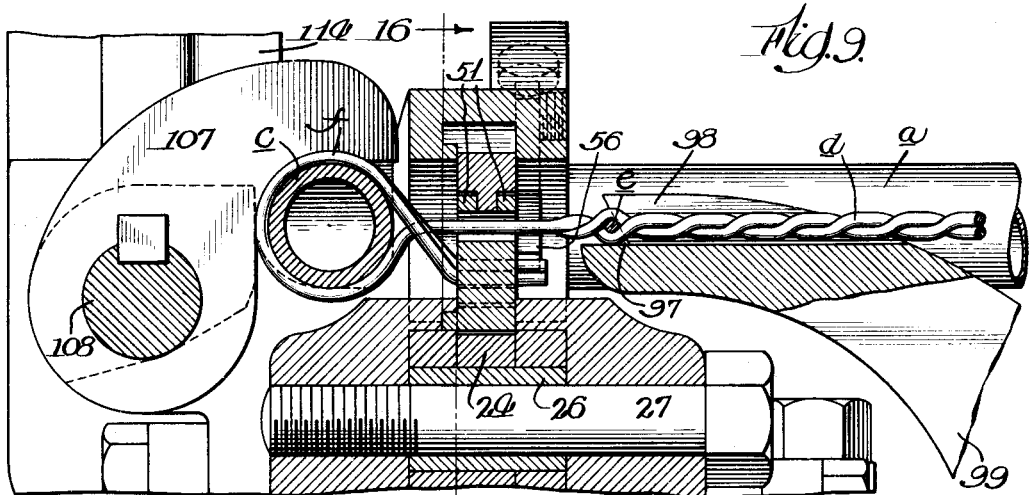
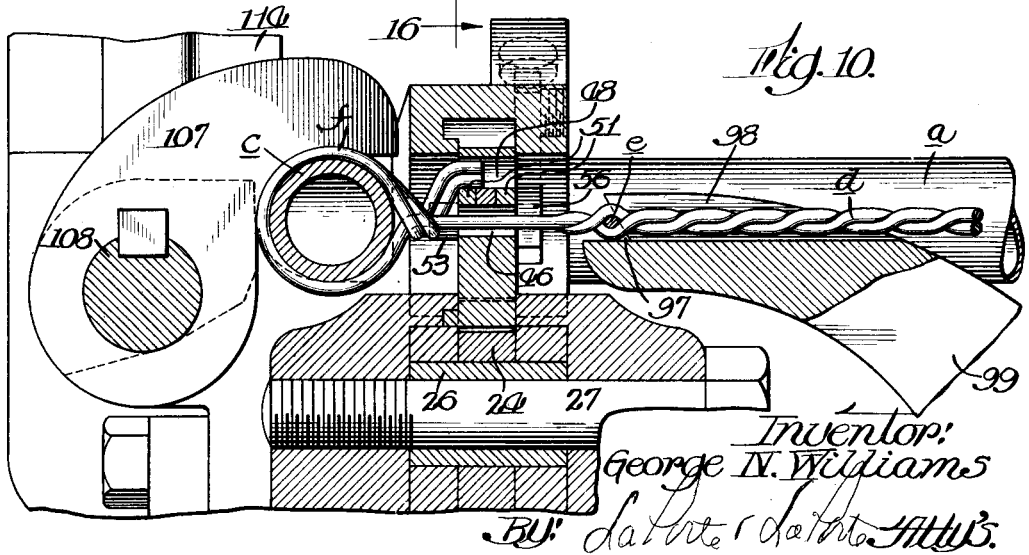

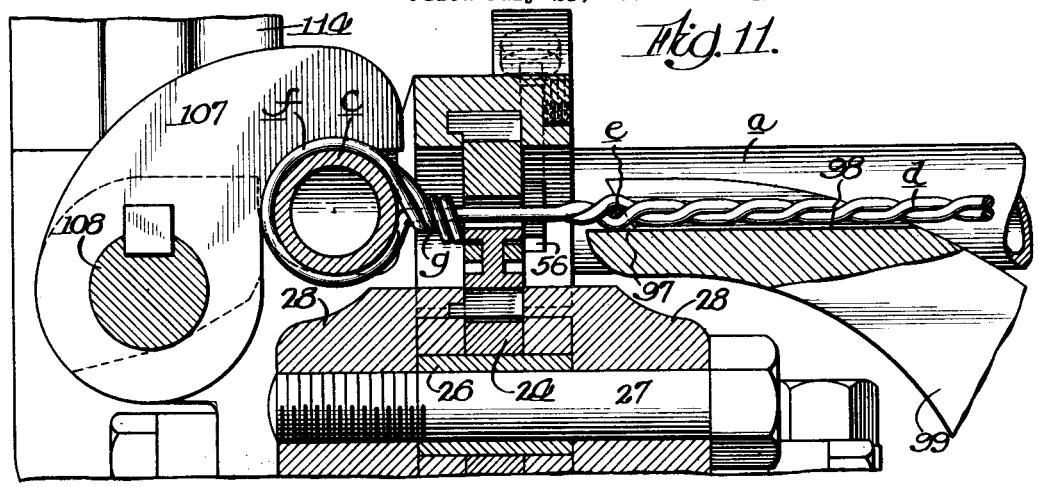
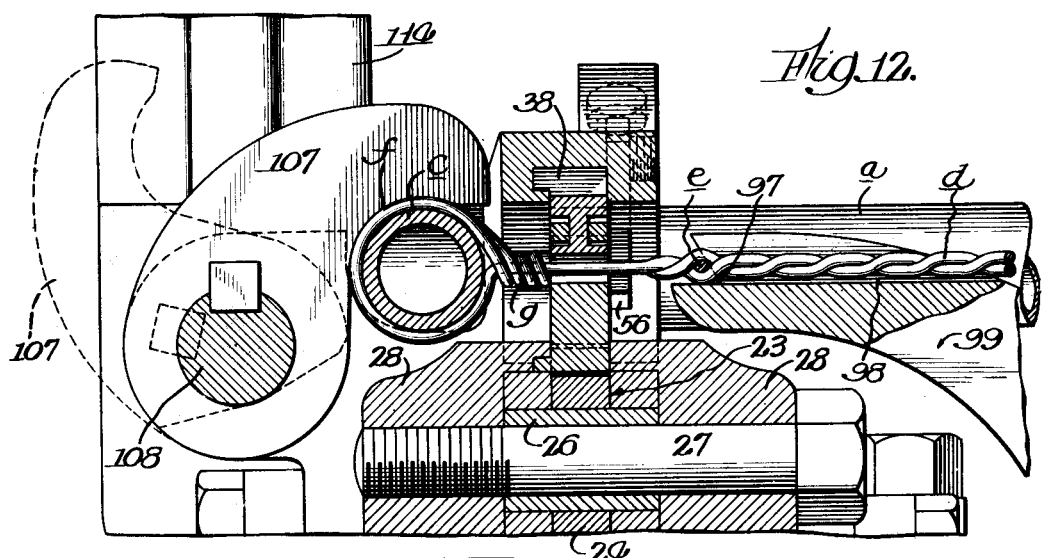
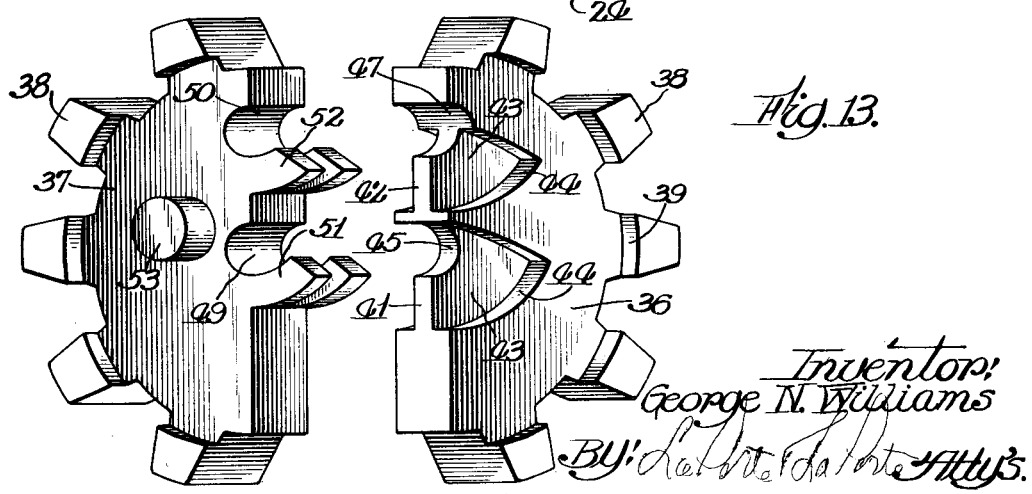

March 1, 1932. G. N. WILLIAMS 1,847,155
MACHINE FOR SECURING WIRE FABRIC TO GATE FRAMES
Filed July 23, 1931 12 Sheets-Sheet 11
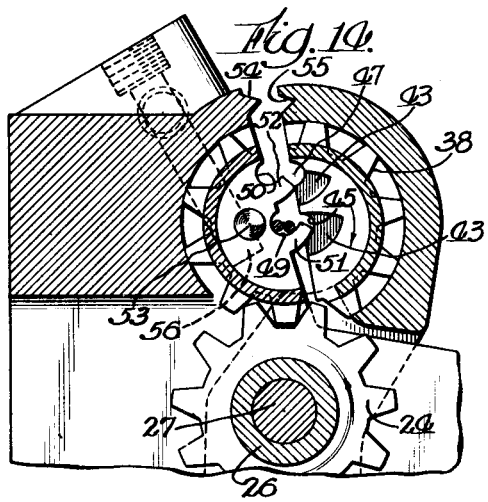
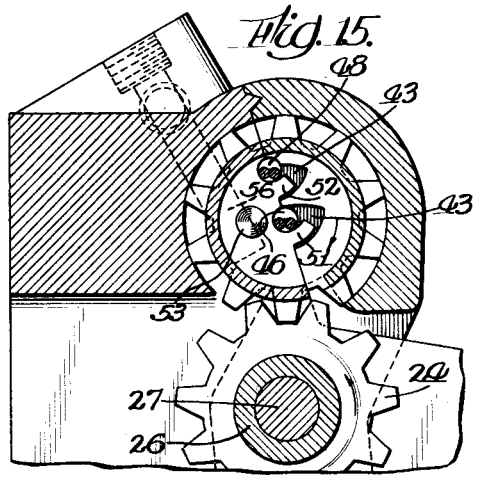
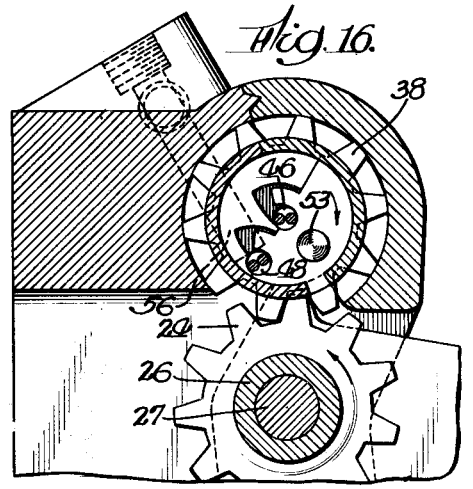
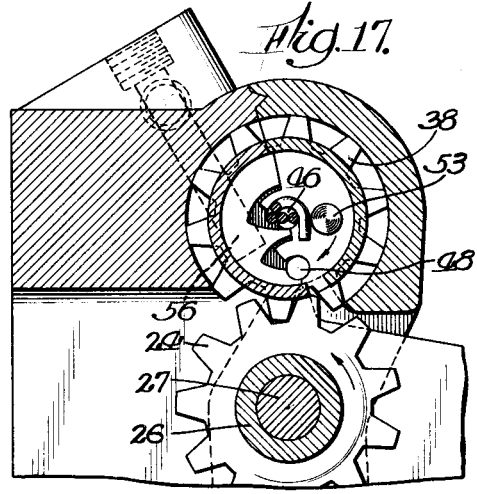
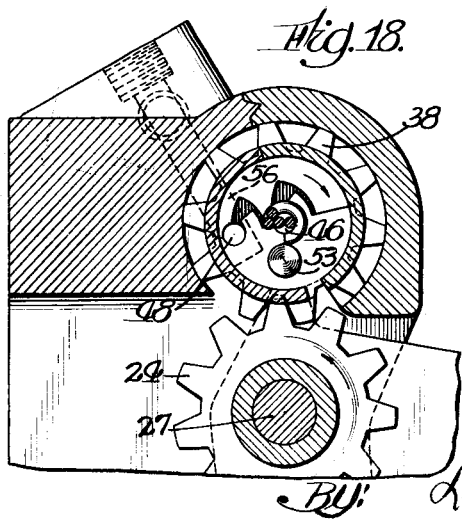
Inventor:
George N. Williams

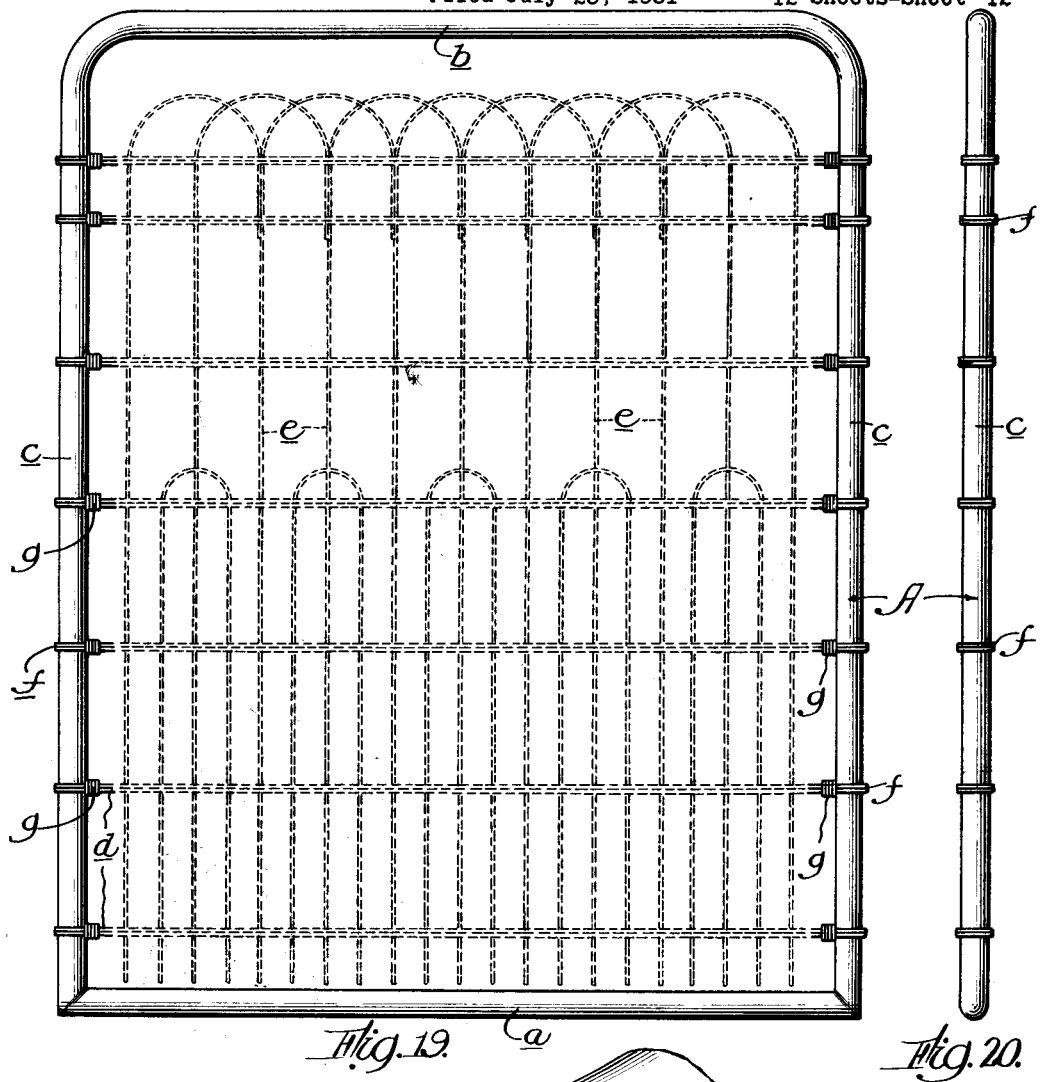

Patented Mar. 1, 1932

1,847,155

UNITED STATES PATENT OFFICE

GEORGE N. WILLIAMS, OF KOKOMO, INDIANA, ASSIGNOR TO CONTINENTAL STEEL CORPORATION, OF KOKOMO, INDIANA, A CORPORATION OF INDIANA

MACHINE FOR SECURING WIRE FABRIC TO GATE FRAMES

Application filed July 23, 1931. Serial No. 552,633.

This invention has reference to a machine for applying and securing a fabric, and in particular wire fabric, in and to a frame, and in particular a gate frame.

In the carrying out of the invention I disclose, for purposes of illustration only, a standard type of gate frame made of tubing and show applied and secured thereto a wire fabric of a standard type of ornamental fencing composed of a plurality of longitudinally disposed and suitably spaced strand or cable wires to which are connected transversely arranged ornamental pickets or stays formed in suitable design. It is to be understood, however, that this disclosure is not intended as a limitation as to the character or design of the frame nor a limitation as to the character or design of the wire fabric applied and secured to such frame.

The invention has for its principal object the employment of a mechanism or means for receiving and supporting a section of wire fabric and which is adapted to be actuated to stretch the fabric taut and also arranged to receive and support a gate frame beyond opposite sides or portions of which, ends or extensions of the longitudinal wires of the fabric section project, which are adapted to be securely fastened to such opposite portions of said gate frame; and means or mechanism being employed which when actuated will wrap the projections or extensions of the longitudinal wires about the opposite sides or portions of the frame, sever any excess lengths of said projected or extended ends of the longitudinal wires so wrapped and finally, coil the ends of the longitudinal wires about their bodies, next adjacent the frame portions, and thereby completely and securely fasten the section of fabric to and within the frame.

Other and further objects will more fully appear from the following description.

That the invention may be more fully understood, reference is had to the accompanying drawings forming a part of this specification illustrating a preferred embodiment of the invention, in which:

Figs. 1 and 1ª, taken together, show a side view of one side of a machine embodying my invention;

Figs. 2 and 2ª, taken together, show a plan view of the machine, dotted lines showing in a diagrammatic manner the placement and location of a gate frame and assembly of fence fabric therein and thereto;

Fig. 3 is a vertical elevation transversely of the machine, partly in section, as the same would appear if taken on the line 3—3, Fig. 1ª, looking in the direction of the arrows, and showing a gate frame and wire filler supported on the machine frame, said machine frame and gate frame being broken away;

Fig. 4 is a detail elevation, partly in section, as the same would appear if taken on the line 4—4, Fig. 2, looking in the direction of the arrows on said figure and shows the twister means assembly, preferably in dual arrangement, for coiling the ends of the longitudinal wires about themselves, said twister means including separable twister sections, the view illustrating the initial placement of the longitudinal wires in certain of the twister sections.

Fig. 5 is a similar view of certain similar parts as shown in Fig. 4, as the same would appear if taken on the line 5—5 of Fig. 2, looking in the direction of the arrows on said figure, and shows the twister assembly in a single arrangement;

Fig. 6 is a transverse sectional detail view as the same would appear if taken on the line 6—6 of Fig. 2, looking in the direction of the arrows on said figure, and is also a transverse section as the same would appear if taken on the line 6—6 of Fig. 4, looking in the direction of the arrows on said figure;

Fig. 7 is a transverse sectional detail view as the same would appear if taken on the line 7—7 of Fig. 2, looking in the direction of the arrows on said figure and is also a transverse section as the same would appear if taken on the line 7—7, of Fig. 5, looking in the direction of the arrows on said figure;

Fig. 8 is a sectional detail of parts similar to those shown in Fig. 7 except that the gate frame has been placed in position and the longitudinal wire wrapped thereover in position for the severance of the excess wire therefrom, the twister sections being closed as in the position shown in Fig. 15;

Fig. 9 is a sectional detail of parts shown in Fig. 8 except that the severing means is in position preparatory to severing the excess length of wire from the longitudinal wire and the parts are in the position substantially as shown in Fig. 16;

Fig. 10 is a sectional detail similar to Fig. 9 except that the parts have moved to position beyond that where the excess wire has been severed from the longitudinal wire;

Fig. 11 is a sectional detail similar to Fig. 10, showing a further step in the coiling of the end or ends of the longitudinal wire about its body, being a step just beyond that which is shown in Fig. 10 and shows the parts in the position and relation as shown in Fig. 17;

Fig. 12 is a sectional detail similar to Fig. 11 but shows the completed step when the end or ends of the longitudinal wire are wrapped tightly about their body for securely fastening the longitudinal wires to the gate frame;

Fig. 13 is a view in perspective showing the separable sections of the twister or twisters;

Figure 1:
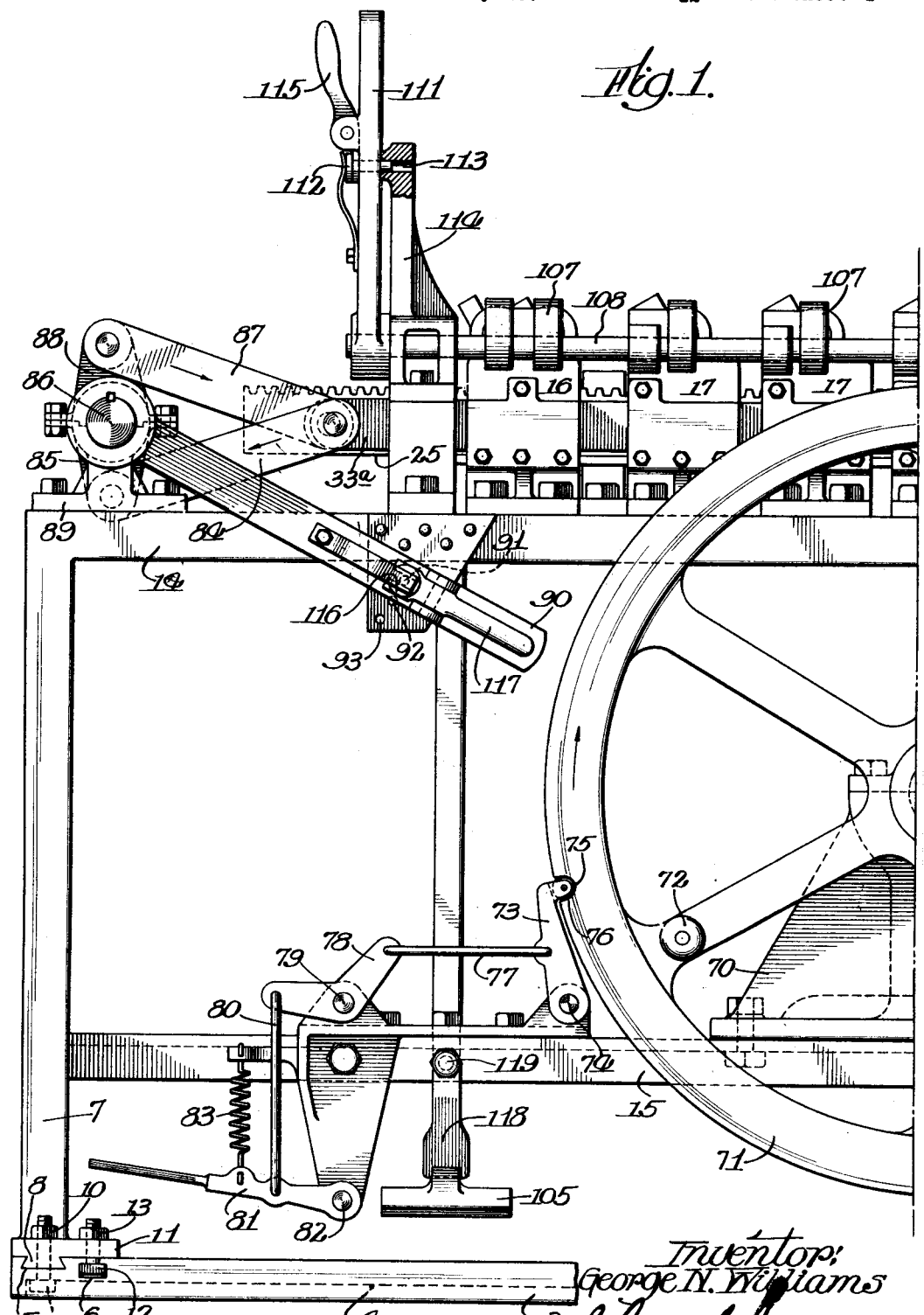

Figs. 14, 15, 16, 17 and 18 are sectional detail views of the separable twister sections, their housing and cutter associated therewith, showing successive steps in the application of the ends of the longitudinal wires thereto and the manner and form of closing the said sections, severing the excess wire from a longitudinal wire and finally coiling the ends of such longitudinal wire or wires about its body for securely fastening the longitudinal wires to a gate frame;

Fig. 19 is a face view of a gate frame and a wire filler securely fastened therein and thereto;

Fig. 20 is an edge view of the gate shown in Fig. 19, and

Fig. 21 is a detail perspective view showing how longitudinal cable or strand wire is wrapped about a gate frame part and the end or ends of the wire coiled about its body as the same is shown fastened in Fig. 19.

Like characters of reference denote corresponding parts throughout the figures.

In the preferred form, when building a machine embodying the invention herein disclosed, it would comprise an arrangement of two corresponding frame units 1 and 2, see Fig. 3. These frame units are substantially duplicates of each other with the one exception and that relates to the means on each unit by which the wire fence fabric is stretched taut just prior to its attachment or securement to a gate frame. In other words, one frame unit, as for example 2, embodies stretching elements which are immovable and the other frame unit 1 embodies stretching elements which are movable. These stretching elements are ranged in number, as may be desired, and they have a co-operative relation whereby to stretch the fabric taut. In Fig. 3, to which reference has been made, a gate frame with a wire filler is shown and the distance at which the frame units 1 and 2 are spaced represent the width of the gate frame accommodated thereto. It is arranged that the frame units 1 and 2 may be adjusted in relation to each other to accommodate different widths of gate frames. The means for accomplishing this is best shown in Figs. 1, 1ª and 3, wherein a base 3 is provided to support the frame units 1 and 2 and said base is channeled underneath as at 4 for approximately its entire length and at its opposite ends is provided with the dove-tail grooves 5 and other grooves 6 adjacent thereto, all of which are disposed transversely of the base. The opposite ends or standard or leg portions 7 of the frame units 1 and 2 are each provided with corresponding dove-tail portions 8 slidable in the dove-tail portions 5 of the base whereby the frame units 1 and 2 may have a slidable relation on the base and be held firmly to the base and for securing the said frame units 1 and 2 in adjusted spaced positions bolts 9 are provided held in place by the nuts 10. As an additional securing and guiding means for the frame units 1 and 2, extensions 11 are provided on the ends, standards or legs of the frame units 1 and 2 to receive bolts 12, the heads of which are seated and have a sliding relation in the grooves 6 in the base and said bolts 12 secured in place by the nuts 13.

Figs. 1 and 1ª which together show a side elevation of the machine, looking in at the left hand side of Fig. 3, show the frame unit 1 which embodies the movable stretcher elements, which are shown on the frame unit 1 in Fig. 3. Figs. 2 and 2ª which taken together, show a plan view of the machine with the frame units 1 and 2 in the same spaced relation as the frame units are shown in Fig. 3. The length of the frame units 1 and 2 when embodying the mechanism for applying and securing a section of wire fence fabric to a gate frame, determines the height or heights of the gate frame which the machine will accommodate. In other words, these frame units 1 and 2 may be of a length which will accommodate a predetermined maximum height of gate frame and yet accommodate frames of considerably less height and frames ranging from a predetermined minimum to a predetermined maximum. This can be accomplished without any adjustment of the mechanism for applying and securing the fence fabric to a frame, other than that the original disposition and spacing of the applying means should be predetermined when it is determined what heights of gate frames may be accommodated to the machine. As pointed out, the length of the frame units 1 and 2, as shown in Figs. 2 and 2ª, will be height in the gate frame, and the spacing apart of the frame units 1 and 2, as illustrated in Figs. 2, 2ª and 3, represent width in the gate frame.

A gate frame such as referred to is designated A and is shown in dotted lines in Figs. 2 and 2ª; in full lines in Figs. 19 and 20 and partly shown in full lines in Fig. 3. Such a gate frame A comprises the lower horizontal rail $a$, the top horizontal rail $b$ and the side vertical rails $c$. These rails may be united by being welded or coupled together in any suitable manner. The height of the gate is determined by the length of the side rails $c$ and the width of the gate is determined by the length of the lower and upper rails $a$ and $b$ and by reference to Figs. 2 and 2ª whereon the dotted outline of the gate frame is shown, will illustrate very clearly what I mean when I refer to the height and width of a gate frame which the frame units 1 and 2 will accommodate. The wire filler secured to the gate frame as best seen in Fig. 19 represents a popular design of ornamental fencing from which a section is cut to provide the filler for the gate frame and which fencing or filler includes or comprises the suitably spaced longitudinal strand or cable wires $d$ to which are connected the transverse pickets or stay wires $e$. The machine of the invention is capable of first stretching the section of wire fabric taut and then to apply or secure the fabric to the gate frame A by wrapping the ends of the strands or cables $d$, as at $f$, about or around the side rails $c$ of the gate frame and then coil the terminal ends of the strands or cables $d$, as at $g$, about or around their bodies, next adjacent to the side rail $c$ of the gate frame, as shown in Figs. 19 and 21 and best seen in the latter figure. As previously pointed out, while I have elected to show a certain standard type or design of gate frame and popular type of fencing, it is to be understood that the design of the frame may be changed both as to outline, configuration and cross-sectional design of the material used and likewise other types of fence fabrics may be used as the filler for the frame. All that is required is that the fence fabric shall have longitudinal strand wires by means of which the fabric may be secured to the gate frame; or, if the dimension of the gate frame is such that its height corresponds to its width and the wire filler is provided with extensions of its stay or picket wires as well as its longitudinal strand wires, the gate frame may have its position changed in the machine so that the stay or picket wires as well as the longitudinal wires shall be wrapped about rail portions of the gate frame and the terminals of such wires secured to their bodies as herein pointed out.

Since I have elected to show the machine as preferably comprising two frame units, 1 and 2, which are similar in construction and design and embodying the same operating parts with the exception that the stretching members on one are stationary and the stretching members on the other are movable, the description of one such unit will suffice for both, except as to the stretching members.

Referring particularly to Figs. 1 and 1ª, and Fig. 3, the unit 1 comprises a suitable frame structure which includes a bed 14 supported by the ends, legs or standards 7, and the latter have connected thereto and joined therewith the table 15. The bed 14 supports the operating mechanism for attaching or connecting wires of the fence filler to the gate frame and the table 15 supports certain operative parts for transmitting motion to the mechanism on the bed and also supports certain controlling or regulating means.

Referring particularly to Figs. 1 and 1ª, 2 and 2ª, 4, 5 and 6, there are shown a plurality of twister assembly housings supported on the bed 14 of the frame unit 1. There may be as many of these said twister assemblies as may be found necessary, expedient or desirable, and they are preferably arranged in suitable spaced relation throughout the length of the frame unit 1, their disposition in relation to each other being determined by the predetermined spacing of the wires of the fence fabric which are to be secured to the frame of the gate for securing the fabric within such frame. In other words, there may be as many twister assemblies as desired, and they may have a predetermined spaced relation with respect to each other or adjusted to each other, as the occasion may require.

Referring now particularly to Figs. 1 and 1ª, the first twister assembly to the left of the frame unit is designated 16 and this assembly is a double assembly, that is, it comprises preferably two twisters, see Fig. 4. The next adjacent twister assembly and several therefrom extending to the right end of the frame unit 1, see Figs. 1 and 1ª, are designated 17, and these twister assemblies are single assemblies, that is. they house a single twister, see Fig. 5; the following, subsequent and concluding twister assemblies extending beyond toward the end of the frame unit 1, see Fig. 1ª, are designated 18 and correspond to the twister assembly 16, in that they each house two twisters. It is apparent from the disclosure of the twister assemblies for the single and double twisters that their arrangement and sequence, whether single or double, may be arranged as operating conditions may require and they may be disposed as shown in sequence as double and single or in any other disposition and grouping as may be desired.

The twister assemblies 16. 17 and 18 are substantially alike in nearly all respects, that is, they each comprise a support, housing members and twisters; the housing members including one movable part and one stationary part and the twisters comprising or including separable sections, one such twister section being carried by the fixed housing member and the other such section being carried by the movable housing member. Referring to Figs. 4, 5, 6 and 7, the twister assemblies are shown as comprising a support 19 bolted to the bed 14 of the frame unit 1 and said support is provided with the angular oppositely disposed offset shelf portions 20 and with the central body portion 21 of the support 19 extending upwardly to provide the stationary portion 22 of the twister housing, whether it be for two twisters or a single twister, such as illustrated in Figs. 4 and 5, and the said body portion 21 is channeled or grooved at 23 for the reception of a spur gear pinion or pinions 24 and a rack bar 25 to mesh therewith for the operation of the same. The spur gear pinion or pinions are rotatable on a sleeve or bushing 26 disposed transversely in the portion 21 of the support 19 and through said sleeve or bushing is carried a bolt or stem 27 which carries on its opposite outer end portions on opposite sides of the portion 21 of the support 19 depending sections 28 of the movable gear housing member 29. The movable gear housing member 29 is fulcrumed through its portions 28 on the bolt or stem 27 so that the said member 29 may be oscillated back and forth to separate the movable twister section from its companion and complementary stationary twister section. The lower extensions of the portions 28 of the movable housing 29 are provided with transversely disposed protruding pins 30 on which are carried blocks 31. In Fig. 6 these blocks 31 are arranged or carried within recesses 32 in rack bars 33. In Fig. 7 these blocks 31 are arranged or carried in recesses 32ª in rack bars 33ª and said rack bars are arranged to be reciprocated back and forth whereby to oscillate the movable housing members 29.

Comparing Figs. 6 and 7, it will be observed that there is a different disposition and arrangement of the blocks 31 and the rack bars 33 and 33ª, although these corresponding elements function substantially the same as they are arranged in the two views, Figs. 6 and 7. Fig. 6 as pointed out is a cross section on the line 6—6 of Fig. 4 where the movable twister housing moves in one direction to separate the twister sections, and Fig. 7 is a sectional view on the line 7—7 of Fig. 5 where the movable twister housing is moved in an opposite direction to separate these separable twister sections. Therefore, to so separate the movable twister housings, which move in opposite directions to each other, as they are shown in Figs. 1 and 1ª and in Figs. 4 and 5, it is desirable and expedient to provide two sets of rack bars; one set designated 33 for moving the movable twister housings associated therewith in one direction and the other set of rack bars 33ª for moving the movable twister housings associated therewith in an opposite direction. It should be obvious that an assembly of twisters and housings and supports therefor could be so disposed that the movable sections of the twister housings would move in one direction and thereby only require one set of rack bars, but since it is desirable to provide double assemblies of twisters due to spacing of the longitudinal wires of wire fabric, the two sets of rack bars are expedient in this arrangement.

By examining Figs. 4 and 5 where in one view a dual arrangement of twisters is shown and where in the other view only a single arrangement of the twister is shown, it will be perfectly obvious that since in Fig. 4 the movable housings 29 move in opposite directions, two sets of rack bars, 33 and 33ª, are necessary, and wherein one set of rack bars is capable of moving the right hand movable twister housing as shown in Fig. 4, such rack bars are also capable of moving the corresponding and similar single movable twister housing in Fig. 5. Should the arrangement of all of the movable twister housings be such that they moved, when opened, in the direction shown in Fig. 5, only one set of rack bars to move the same would be required and this would be likewise true if all of the movable twister housings were moved, when opened, in the direction of that shown at the left in Fig. 4.

The portions 21 of the supports 19 of the twister assemblies are recessed, as at 34, to provide seats for the stationary sections of the twisters, see particularly Figs. 4 and 5, and the upper portions of the movable housing members for the twisters are similarly or likewise recessed at 35 to provide seats for the movable sections of the twisters. In the use of the term "stationary" as applied to one section of a twister and the use of the term "movable" as applied to the other section of a twister, it is to be understood that the stationary section is only stationary when the movable section is separated therefrom or moved from and to such section and that when the two sections are joined or are brought into cooperative relation, the two said sections are capable of being rotated as a unit.

Since the twisters and the sections comprising each twister are all alike, the description of one will suffice for all. These twisters are shown in their different relationships in Figs. 4, 5 and 13 to 18, both inclusive. The stationary section, as referred to, is designated 36 and the movable section, as referred to, is designated 37. Both of these sections are provided with the gear teeth 38 which when the sections of the twister are in closed position and operative, mesh with and are rotated by the teeth on the spur gear pinion 24. The said two sections of the twister, when the movable housing member is closed with the stationary part of the housing member, rotate in the recesses 34 and 35 and when the twister sections are separated, one of said sections remains seated in one recess and the other section remains seated in the other recess and both the said sections of the twister have a smooth face on one side as is shown in Figs. 6 and 7 and an offset face on the other side as indicated at 39 which is complementary to a seat 40 in a section of the twister housing. Referring to the twister comprising the sections 36 and 37 and having reference particularly to Fig. 13, it will be observed that one of said sections, as for instance 36 in this instance, is provided with thin spaced central web portions 41 and 42 on the opposite sides of both of which are recesses 43 formed by the converging walls 44. The web 41 at the center of the said section 36 merges into a semicircular wall 45 which, together with a corresponding wall on the other section 37, forms an axial opening 46 through the twister, as is best seen in Figs. 15 to 18, both inclusive. The outer portion of the web 42 merges into a semicircular wall 47 corresponding to the wall 45 which, together with a corresponding wall in the other section 37, provides an opening 48 through the twister which is eccentrically or offset disposed to the opening 46, also best seen in said Figs. 15 to 18, both inclusive. The section 37, reference being again had to Fig. 13, is provided with a semicircular wall 49 corresponding to the wall 45 of the other section and is also provided with the semicircular wall 50 corresponding to the similar wall 47 on the other section. On the inner face of the section 37 are provided spaced fingers 51, the inner surface of which, forms a continuation of the semicircular wall 49 and also provided with spaced fingers 52, the inner surface of which, form a continuation of the semicircular wall 50. When the two said twister sections 36 and 37 are in closed operative position, the spaced fingers 51 lie within the recesses 43 on opposite sides of the web 41 and the fingers 52 lie within the recesses 43 on the opposite sides of the web 42. These corresponding elements or parts on the separate sections being complementary to each other so that when the sections are in closed and operative position the axial openings 46 and 48 are formed as is shown by Figs. 15 to 18, both inclusive. On one of these twister sections and as shown in Fig. 13 on the section 37, there is provided a laterally projecting coiling pin 53 projecting from one face which is employed, as hereinafter more fully pointed out, to coil the terminal ends of wires of the fence fabric filler around their bodies for securely fastening the wires of the fabric to portions of the gate frame. In each instance, the coiling pin 53 is preferably carried by the twister section having the fingers 51 and 52. The location of the coiling pin in each instance is at a proper location on its section as will accomplish an effective coiling of the terminals of the wires of the fabric filler to insure a very tight wrap or coil of the wires about their own bodies.

To insure a correct seating of the movable portion of the twister housing on and against the stationary portion of the said twister housing, one of said sections is provided with a preferably V-shaped lug or wedge-shaped projection 54 which is adapted to have a seating relation in a corresponding complementary seat 55 on the other section. Included in the twister assembly in each instance, there is provided in association with each twister and preferably on its flat side, a wire cutter 56 which is removably secured to the assembly housing in each instance and its cutting end portion normally lying in close relationship to the axis of the twister.

Referring to Figs. 1 and 1ª, the rack bar 25 which operates the pinions 24 extends throughout approximately the full length of the frame unit 1, being of sufficient length so that when reciprocated proper actuation of the pinions 24 may be obtained. One end of the rack bar 25, see Fig. 1ª, is reciprocable between the longitudinal guiding blocks 57 and is guided in its movement by means of the guides 58 slidable in grooves 59 in the said blocks 57. Connecting the guides 58 with the end of the rack bar is a pin 60 and said pin also carries blocks 61 which are slidable in guides 62 formed in the upper bifurcated ends 63 of a lever arm 64 fulcrumed at 65 to a bracket 66 secured to an end, standard or leg 7 of the frame unit 1, and having a pivotal connection at 67 with the opposite and lower end of the lever 64, is a pitman bar 68 connected in crank-like manner with an operating shaft 69 which is journaled in a bearing support 70 mounted on the table 15 of the frame unit 1. On the shaft 69 is a preferably hand operated fly wheel 71 provided with a hand hold 72 by means of which the fly wheel 71 may be turned and when so turned reciprocate the pitman bar 68 which in turn will oscillate the lever 64 and it in turn impart reciprocal movement to the rack bar 25 to impart motion to the pinions 24 and through said pinions imparting rotation to the twister wheels formed of the sections 36 and 37. During the step of shearing excess wire from the terminal ends of the wires of the fence filler being attached to the frame and the subsequent coiling of these terminal ends of the wires around their bodies, the fly wheel 71 is caused to be rotated one complete revolution. To insure that this fly wheel will be rotated only one complete revolution during these operations, I provide an automatic locking means which is first initially disengaged to permit the rotation of the fly wheel and which, when the fly wheel makes one complete rotation, operates to stop and to lock the fly wheel and the parts connected therewith. This locking means comprises a lever 73 pivoted at 74 to the frame unit 1 and said lever at its free end is provided with a roller 75 adapted to have a seating relation in a recess 76 in the periphery of the fly wheel, as is shown in Fig. 1. Connected to the lever 73 is a link 77 which also has connection with one end of a lever 78 of bell crank-like form pivoted to the frame at 79 and to the opposite end of said lever 78 is connected a link 80 which also has connection with a foot lever 81 pivoted at 82 to the frame. Connecting the lever 81 and the frame is a spring 83. To release the lever 73 from the fly wheel 71, the attendant or operator will depress the foot lever 81 and through its connections, just described, with the lever 73, will move the roller 75 out of engagement with the seat 76 in the fly wheel and immediately on the operator imparting rotative movement to the fly wheel, he will release the foot lever 81 so that the roller 75 will ride against the smooth peripheral surface of the fly wheel 71 until the recess 76 is brought into coincidence with the roller 75 when said roller, will, under the tension of the spring 83, be caused to enter the seat 76 in the fly wheel and automatically stop and lock the fly wheel 71 against further rotation, and until the roller 75 is again disengaged as previously described. This locking means also serves as an indicator to the operator, and when the fly wheel is arrested and stopped in its rotation, he knows that the operation of coiling the terminal ends of the wires of the fence filler has been completed on the frame to which the filler is attached, and further, that the twisters have been stopped in proper position where the sections of the twisters may be separated to permit the removal of the gate frame with the wire filler firmly and securely attached thereto and following which another wire fabric section may be placed and further operation continued for the securement of such a filler to a gate frame.

I have previously described the operating connections between the movable twister housing sections and the rack bars 33 and 33ᵃ.

Referring to Figs. 1 and 2, the mechanism for opening and closing the movable sections of the twister housings and movable twister sections therewith will now be described. Having a pivotal connection with an end of each of the rack bars 33ᵃ are pairs of links or straps 84, the opposite ends of each pair of which have pivotal connection with cranks 85 connected with a crank shaft 86. These link or strap connections are located on extreme outsides of the rack bar 25. Having a similar connection with the pairs of rack bars 33 which are located on the opposite sides of the rack bar 25 and between said bar and the rack bars 33ᵃ, are pairs of links or straps 87 and these sets of straps each have connection with a crank arm 88 connected with the crank shaft 86. By reference to Fig. 1, it will be observed that the crank arms 85 and 88 are diametrically disposed in relation to each other and their connection with the shaft 86 so that when the shaft 86 is oscillated, as will be explained, for the purpose of separating the sections of the twisters, the links or straps 84 will be moved outwardly moving the rack bars 33ᵃ in a corresponding direction, whereas the links or straps 87 will be moved inwardly and correspondingly move the rack bars 33 connected therewith. The shaft 86 is journaled in suitable bearings 89 supported by the frame of the frame unit 1. To the outer end of the crank shaft 86 is connected a preferably hand operated lever 90 which is adapted to be oscillated downwardly and upwardly to impart oscillation to the shaft 86 and said lever has three settings, one indicated at 91, another indicated at 92 and the last indicated at 93. In the position in which the lever 90 is shown, the twister sections are closed as they would appear in Figs. 15 to 18, both inclusive. On the movement of the lever 90 from the setting 91 to the setting 93, the twister sections are moved to their limit of operation, as is best seen in Figs. 4 and 5 at which setting the wires of the wire fabric filler are dropped or laid into position on the fingers 51 which will guide them into seating relation into the semicircular seat 49 of the twister. When this has been accomplished, the operator will move the lever 90 upward from the setting 93 to the setting 92 which will move the movable twister sections to the position shown in Fig. 14 to permit the ends of the wires of the fabric filler, which are to be attached to the gate frame, to be moved over into the position shown in Fig. 8 with the ends of the wires seated on the fingers 52 and in the semicircular seat 50 of the twister sections and then upon the movement of the lever 90 from the setting 92 to the setting 91, the sections of the twisters will be in their closed position, as shown in Figs. 15 to 18, both inclusive, with the ends of the wires as shown in Fig. 15. When the parts are in this position and the sections of the twisters are closed, the several elements and parts of the complete mechanism are now so disposed in their relation to each other preparatory to the rotation of the fly wheel 71 for severing the excess ends of the wires and coiling the ends of the wires about their bodies for firmly and securely fastening the wire fabric filler to the gate frame.

In Figs. 15 to 18, both inclusive, and in Figs. 8 to 12, both inclusive, are shown the several steps of the operation of severing the ends of the wires and fastening them about their bodies.

Assuming now that the twister sections have been separated preparatory to receiving the wires of a wire fabric filler in the axial opening of the twisters, in the manner shown in Figs. 4 and 5, such a filler is laid on the machine with a stay or picket wire seated to be held in jaws 94 on preferably fixed and immovable stretching members 95, of which there is a plurality, one for each of the twisters in the twister assemblies referred to, see Figs. 2 and 2ª and Fig. 3. These fixed and immovable stretching members 95 are all carried by the frame unit 2 and are secured to a common longitudinal rod 96 secured to the frame 2. When a stay or picket wire of the fabric filler has been so placed on the fixed and immovable stretching members 95, a stay or picket wire removed from the stay or picket wire previously referred to is seated in jaws 97 and within grooves or recesses 98 on rocker arms 99, of which there is a plurality, one for each of the twisters of the twister assemblies carried by the frame unit 1. These rocker arms are carried by a shaft 100 suitably journaled on the frame unit 1 and connected with said shaft is a crank arm 101 to which is pivotally connected at 102 and from which depends a connecting rod 103, which at its lower end has a pivotal connection at 104 with a foot lever 105 fulcrumed at 106 to the table 15 of the frame unit 1, the said lever 105 extending from rearward of the frame unit 1 forward thereof, as is shown in Figs. 1 and 3 whereby to be engaged by the foot of an operator in attendance at the machine. On the operator pressing down the lever 105, he lifts the connecting rod 103 and rocks the rocker arms 99 forwardly from the dotted line position shown in Fig. 7 to the full line position shown in said figure, which movement of the rocker arms will stretch the fabric taut between the frame units 2 and 1 and at the same time will cause the projecting ends of the line wires of the fabric to be dropped into the twisters, as shown in Figs. 4 and 5 with the projecting end extensions of the longitudinal wires lying across bending and clamping members 107, see particularly Figs. 3 and 7, although shown in other figures of the drawings, particularly Figs. 1 and 1ª and 2 and 2ª. These bending and clamping members 107 are carried on a rock shaft 108 journaled lengthwise of the frame units 1 and 2 and each bending and clamping member is slotted as at 109, see Fig. 7, forming a seat for the extended terminals of the longitudinal wires. When the fence fabric filler has been so stretched and seated, a gate frame is laid on the frame units 1 and 2 so that the rails c are seated and rest in the seats 110, see Fig. 7, on the respective frame units 1 and 2, with the rails c depressing the extensions of the longitudinal wires of the wire fabric filler somewhat as shown in Figs. 8 to 12, both inclusive, and when the frame is so seated, then it is that the rock shaft 108 is partially rotated for the purpose of swinging the bending and clamping members 107 from the position shown in Fig. 7 to the position shown in Fig. 8 and like figures, which movement of the bending and clamping members will force the ends of the longitudinal wires up and over a rail c, it being understood, of course, that before the terminal ends of the longitudinal wires can be seated in the twisters, as shown in Fig. 8, the movable twister sections must be moved from the full opened position shown in Figs. 4 and 5 to the partially closed position in Fig. 14 so that the terminal ends of the wires, as illustrated in Fig. 8, will be forced into the offset openings 48 in the twister sections, when they may be completely closed preparatory to the shearing action by the cutter of the excess ends of the longitudinal wires and the said ends then coiled about their bodies. The partial closing of the sections of the twisters, as will be understood, will enclose the extended ends of the longitudinal wires when they are initially seated, as in Figs. 7 and 14, and will insure the bent over ends of the terminals of said longitudinal wires being seated in the openings 48 of the twisters and prevent their dropping into the axial openings 46. To accomplish the rocking of the rock shaft 108 for the purpose of moving the bending and clamping members 107 from their inoperative position shown in Fig. 7 to the operative position shown in Fig. 8, a lever 111, see Fig. 1, is connected to one end of the rock shaft 108. This lever in its normal inoperative position extends downwardly and outwardly and may be grasped by the attendant or operator and lifted upwardly imparting rocking motion to the shaft 108 and moving the bending and clamping arms 107 in like manner and when the lever has reached its upward extent of movement in which position the bending or clamping members 107 have assumed the position shown in Fig. 8, the lever is adapted to be locked in position by means of the spring held detent 112 carried by the lever 111 and which seats itself in an opening 113 in a bracket 114 supported by and extending upwardly from the frame unit 1. To release the detent 112, a releasing member 115 is provided in operative relation with the detent, as shown in Fig. 1.

Assuming further that the terminal ends of the longitudinal wires of the fence fabric filler have been secured in the twisters in the manner in which they are shown in Figs. 8, 14 and 15 and the twisters have been completely closed by the movement of the lever 90 to the setting at 91, see Fig. 1, the twisters are now ready to be actuated by the rotation of the fly wheel 71 for first severing off the excess ends of the terminals of the longitudinal wires and then coiling the ends of said terminals about their bodies as shown complete in Fig. 12. On the operation or turning of the fly wheel 71, motion is imparted, as previously described, to the rack bar 25 to reciprocate it which in turn will impart rotative movement to the twisters. As the twisters are rotated, the openings 48 therein are moved from the position shown in Fig. 15 to the position shown in Fig. 16 at which point the excess ends, if there are any, of the terminals of the longitudinal wires, are caused to pass the cutters 56 which will sever off any such excess ends, and then during the continued rotation of the twisters the terminal ends of the longitudinal wires, as shown in Fig. 10, will be caused to be withdrawn from within the openings 48 and simultaneously with such withrawal, the coiling pin 53 will begin to function in its engagement with the terminal ends of the longitudinal wires and cause them to be firmly and completely coiled and wrapped about their bodies between the twisters and a rail of the gate frame in substantially the manner as shown in Figs. 10 to 12, both inclusive. During the operation of severing and the coiling of the ends of the longitudinal wires, the rack bar 25 makes a complete reciprocation or stroke in one direction during one-half revolution of the fly wheel 71 and during which time two complete rotations of the twisters are made. On the completion of the coil or securement of the terminal ends of the longitudinal wires about their bodies, as shown in Figs. 12 and 18, then the rack bar is caused to make a complete reciprocation or stroke in the opposite direction whereby to return or reverse the twisters to their normal initial position ready and in position for reopening for the resumption of the operations previously described for the reception of another piece of fabric to be attached to another gate frame.

Referring to the lever 90, the provision of the means for setting the said lever at the settings 91, 92 and 93, comprises a spring held detent 116 under the control of a release 117, operative in the manner usual to devices of this character. Referring to the foot lever 105, a locking means is provided for this lever whereby to hold the locking arms 99 in fabric stretching position shown in full lines in Fig. 7, which said means comprises a locking member 118 pivoted at 119 to the table 15 of the frame unit 1 which may be kicked into position by the operator after the lever 105 has been depressed and to engage the same in the manner shown in Figs. 1 and 3. To release the member 118, pressure need only be applied to the foot lever 105 and said member 118 kicked out of the way which will release the stretching members 99 from their full line position shown in Fig. 7 to the dotted line position shown in said figure.

It should be pointed out here, as has been previously stated, that the frame units 1 and 2 with their operating mechanisms are substantially the same with the single exception that the frame unit 1 shows movable stretching members and the frame unit 2 shows fixed stretching members. I mean by that, that the operating parts which have been described and which are disclosed on Figs. 1 and 1ᵃ are duplicated on the frame unit 2 so that when the attendant or operator has completed his operations with respect to the mechanism and means on the frame unit 1 for attaching the longitudinal wires to the frame of a gate, he will step around to the other side of the machine at the frame unit 2 and duplicate the same operations with the same elements described in connection with the frame unit 1, whereby the opposite ends of the longitudinal wires of the wire fabric filler are securely coiled and fastened to their bodies, as is shown in Fig. 12. It should be obvious that if desired, instead of having fixed and immovable stretching members on the frame unit 2, as illustrated in Fig. 3, that these members may be movable and connected with similar operating means as the movable stretching members shown in said figure. Furthermore, it should be obvious that even though a dual mechanism is desired for bending over the opposite ends of the longitudinal wires about portions of the gate frame, that it is within the range of mechanical possibilities to employ a single operating means operatively connected through a single shaft which carries the fly wheels and transmits motion from said shaft to the two rack bars 25, and I, therefore, do not desire to be limited to the inclusion of the two separate fly wheels and their operating connections with the two rack bars 25, nor to other details of arrangement and construction which are within the realm and range of the scope of the invention herein disclosed.

What I claim is:—

1. In a machine of the character described, in combination, means to support a wire filler for a gate frame, means to support a gate frame in association with said filler, means to wrap ends of wires of the filler about members of the frame, and means for securing the terminal ends of said wires to their bodies for fastening the filler to the frame.

2. In a machine of the character described, in combination, means to support and stretch a wire filler for a gate frame, means to support a gate frame in association with said filler, means to wrap ends of wires of the filler about members of the frame, and means for securing the terminal ends of said wires to their bodies for fastening the filler to the frame.

3. In a machine of the character described, in combination, means to support a wire filler for a gate frame, means to support a gate frame in association with said filler, means to wrap ends of wires of the filler about members of the frame, and means for coiling the terminal ends of said wires about their bodies for fastening the filler to the frame.

4. In a machine of the character described, in combination, means to support and stretch a wire filler for a gate frame, means to support a gate frame in association with said filler, means to wrap ends of wires of the filler about members of the frame, and means for coiling the terminal ends of said wires about their bodies for fastening the filler to the frame.

5. In a machine of the character described, in combination, means to support a wire filler for a gate frame, means to support a gate frame in association with said filler, said supporting means comprising separable units in spaced relation and adjustable relative to each other, means on each unit to wrap the opposite ends of wires of the filler about opposite members of the frame, and means for securing the terminal ends of said wires to their bodies for fastening the filler to the frame.

6. In a machine of the character described, in combination, means to support a wire filler for a gate frame, means to support a gate frame in association with said filler, said supporting means comprising separable units in spaced relation and adjustable relative to each other, cooperating means on each unit for stretching the filler, means on each unit to wrap the opposite ends of wires of the filler about opposite members of the frame, and means for securing the terminal ends of said wires to their bodies for fastening the filler to the frame.

7. In a machine of the character described, in combination, means to support a wire filler for a gate frame, means to support a gate frame in association with said filler, said supporting means comprising separable units in spaced relation and adjustable relative to each other, means on each unit to wrap the opposite ends of wires of the filler about opposite members of the frame, and means for coiling the terminal ends of said wires about their bodies for fastening the filler to the frame.

8. In a machine of the character described, in combination, means to support a wire filler for a gate frame, means to support a gate frame in association with said filler, said supporting means comprising separable units in spaced relation and adjustable relative to each other, cooperating means on each unit for stretching the filler, means on each unit to wrap the opposite ends of wires of the filler about opposite members of the frame, and means for coiling the terminal ends of said wires about their bodies for fastening the filler to the frame.

9. In a machine of the character described, in combination, means to support a wire filler for a gate frame, means to support a gate frame in association with said filler, said supporting means comprising separable units in spaced relation and adjustable relative to each other, means on each unit to wrap the opposite ends of wires of the filler about opposite members of the frame, twisting means for coiling the terminal ends of said wires about their bodies for fastening the filler to the frame, and means for operating said twisters.

10. In a machine of the character described, in combination, means to support a wire filler for a gate frame, means to support a gate frame in association with said filler, said supporting means comprising separable units in spaced relation and adjustable relative to each other, cooperating means on each unit for stretching the filler, means on each unit to wrap the opposite ends of wires of the filler about opposite members of the frame, twisting means for coiling the terminal ends of said wires about their bodies for fastening the filler to the frame, and means for operating said twisters.

11. In a machine of the character described, in combination, twisting means comprising separable twister sections, means to separate and close said twister sections, means to support a wire filler for a gate frame with ends of wires thereof deposited between said twister sections, means to support a gate frame in association with said filler, means to wrap ends of wires of the filler about members of the frame and to deposit the terminal ends of said wires between said sections of twisters, and means to operate the twisters for securing the terminal ends of said wires to their bodies for fastening the filler to the frame.

12. In a machine of the character described, in combination, twisting means comprising separable twister sections, means to separate and close said twister sections, means to support a wire filler for a gate frame with ends of wires thereof deposited between said twister sections, means to support a gate frame in association with said filler, means to wrap ends of wires of the filler about members of the frame and to deposit the terminal ends of said wires between said sections of twisters, and means to operate the twisters for securing the terminal ends of said wires to their bodies next adjacent members of the frame for fastening the filler to the frame.

13. In a machine of the character described, in combination, twisting means comprising separable twister sections, means to separate and close said twister sections, means to support and stretch wire filler for a gate frame with ends of wires thereof deposited between said twister sections, means to support a gate frame in association with said filler, means to wrap ends of wires of the filler about members of the frame and to deposit the terminal ends of said wires between said sections of twisters, and means to operate the twisters for securing the terminal ends of said wires to their bodies for fastening the filler to the frame.

14. In a machine of the character described, in combination, twisting means comprising separable twister sections, means to separate and close said twister sections, means to support and stretch a wire filler for a gate frame with ends of wires thereof deposited between said twister sections, means to support a gate frame in association with said filler, means to wrap ends of wires of the filler about members of the frame and to deposit the terminal ends of said wires between said sections of twisters, and means to operate the twisters for coiling the terminal ends of said wires about the bodies next adjacent members of the frame for fastening the filler to the frame.

15. In a machine of the character described, in combination, twisting means comprising separable twister sections, means to separate and close said twister sections, means to support a wire filler for a gate frame with ends of wires thereof deposited between said twister sections, means to support a gate frame in association with said filler, means to wrap ends of wires of the filler about members of the frame and to deposit the terminal ends of said wires between the said sections of twisters, a cutting means in association with each twister, and means to operate the twisters during such separation, sever any excess ends from the terminal ends of said wires and subsequently coil said terminal ends about their bodies for fastening the filler to the frame.

16. In a machine of the character described, in combination, twisting means comprising separable twister sections, means to separate and to close said twister sections, means to support and stretch a wire filler for a gate frame with ends of wires thereof deposited between said twister sections, means to support a gate frame in association with said filler, means to wrap ends of wires of the filler about members of the frame and to deposit the terminal ends of said wires between said sections of twisters, a cutting means in association with each twister, and means to operate the twisters and during such operation sever any excess ends from the terminal ends of the wires and to subsequently coil said terminal ends about their bodies next adjacent the members of the frame for fastening the filler to the frame.

17. In a machine of the character described, in combination, means to support a wire filler for a gate frame, means to support a gate frame in association with said filler, said supporting means comprising separable units in spaced relation and adjustable in relation to each other, a plurality of stretching members on each unit, means to actuate certain of said stretching members, means on each unit to wrap opposite ends of wires of the filler about members of the frame, and means for securing the terminal ends of said wires to their bodies for fastening the filler to the frame.

18. In a machine of the character described, in combination, means to support a wire filler for a gate frame, means to support a gate frame in association with said filler, said supporting means comprising separable units in spaced relation and adjustable in relation to each other, a plurality of stretching members on each unit, means to actuate certain of said stretching members, means on each unit to wrap opposite ends of wires of the filler about members of the frame, and twisting means on each unit for coiling the terminal ends of said wires about their bodies for fastening the filler to the frame.

19. In a machine of the character described, in combination, means to support a wire filler for a gate frame, means to support a gate frame in association with said filler, said supporting means comprising separable units in spaced relation and adjustable in relation to each other, a plurality of stretching members on each unit, means to actuate certain of said stretching members, means on each unit to wrap opposite ends of wires of the filler about members of the frame, and twisting means on each unit for coiling the terminal ends of said wires to their bodies next adjacent to members of the frame for fastening the filler to the frame.

20. In a machine of the character described, in combination, means for attaching the ends of wires of a fabric filler to a gate frame comprising a support for the filler and for a member of the frame in association with said filler, a plurality of twisting members on said support, means for wrapping the ends of filler wires about the member of the frame and for depositing the terminal ends of said wires in said twisters, and means for operating the twisters for coiling the ends of the wires about their bodies to secure said wires to the member of the frame.

21. In a machine of the character described, in combination, means for attaching the ends of wires of a fabric filler to a gate frame comprising a support for the filler and for a member of the frame in association with said filler, a plurality of twisting members on said support, means for wrapping the ends of filler wires about the member of the frame and for depositing the terminal ends of said wires in said twisters, and means for operating the twisters for coiling the ends of the wires about their bodies next adjacent the member of the frame to secure said wires to the frame.

22. In a machine of the character described, in combination, means for attaching the ends of the wire of a fabric filler to a gate frame comprising a support for the filler and for a member of the frame in association with said filler, a plurality of rotatable twisting members on said support, each of said twisting members comprising separable sections, means to separate the sections of twisters to a point for the reception therebetween of the bodies of wires of the filler for initial positioning of said wires in the twisters, means for partially closing the twister sections, means for wrapping the ends of said wires about a member of the frame and for depositing the terminal ends of the wires between said sections of twisters, means for closing the twister sections, and means for rotating the twisters to coil the terminal ends of said wires about their bodies.

23. In a machine of the character described, in combination, means for attaching the ends of the wires of a fabric filler to a gate frame comprising a support for the filler and for a member of the frame in association with said filler, a plurality of rotatable twisting members on said support, each of said twisting members comprising separable sections, means to separate the sections of twisters to a point for the reception therebetween of the bodies of wires of the filler for initial positioning of said wires in the twisters, means for partially closing the twister sections, means for wrapping the ends of said wires about a member of the frame and for depositing the terminal ends of the wires between said sections of twisters, means for closing the twister sections, and means for rotating the twisters to coil the terminal ends of said wires about their bodies next adjacent the member of the frame.

24. In a machine of the character described, in combination, means for attaching the ends of the wires of a fabric filler to a gate frame comprising a support for the filler and for a member of the frame in association with said filler, a plurality of rotatable twisting members on said support, each of said twisting members comprising separable sections, means to separate the sections of twisters to a point for the reception therebetween of the bodies of wires of the filler for initial positioning of said wires in the twisters, means for partially closing the twister sections, means for wrapping the ends of said wires about a member of the frame and for depositing the terminal ends of the wires between said sections of twisters, means for closing the twister sections, a cutting means in association with each twister, and means for rotating the said twisters and during such rotation sever any excess of terminal ends of the said wires and subsequently coiling said terminal ends about their bodies.

25. In a machine of the character described, in comination, means for attaching the ends of the wires of a fabric filler to a gate frame comprising a support for the filler and for a member of the frame in association with said filler, a plurality of rotatable twisting members on said support, each of said twisting members comprising separable sections, means to separate the sections of twisters to a point for the reception therebetween of the bodies of wires of the filler for initial positioning of said wires in the twisters, means for partially closing the twister sections, means for wrapping the ends of said wires about a member of the frame and for depositing the terminal ends of the wires between said sections of twisters, means for closing the twister sections, a cutting means in association with each twister, and means for rotating the said twisters and during such rotation sever any excess of terminal ends of the said wires and subsequently coiling said terminal ends about their bodies, next adjacent the member of the frame.

26. In a machine of the character described, in combination, separate and spaced supporting units adjustable toward and from each other, equivalent means on each unit for receiving a wire filler for a gate frame, equivalent means on each unit for supporting opposite members of a gate frame above the filler, equivalent twisting members on each of said units in axial alignment and adapted for the initial placement of the bodies of wires of the filler therein, equivalent means on each unit for wrapping the opposite terminal ends of said wires about opposite members of said frame and for depositing the terminal ends of the said wires in the said twisters, means for actuating said wrapping means, and equivalent means on each unit for operating the twisters of said respective units for coiling the opposite ends of said wires about their bodies for fastening the filler to the frame.

27. In a machine of the character described, in combination, separate and spaced supporting units adjustable toward and from each other, stretching members on each unit for receiving a wire filler for a gate frame, means to actuate certain of said stretching members for stretching the filler taut, equivalent means on each unit for supporting opposite members of a gate frame above the filler, equivalent twisting members on each of said units in axial alignment, and adapted for the initial placement of the bodies of wires of the filler therein, equivalent means on each unit for wrapping the opposite terminal ends of said wires about opposite members of said frame and for depositing the terminal ends of the said wires in the said twisters, means for actuating said wrapping means, and equivalent means on each unit for operating the twisters of said respective units for coiling the opposite ends of said wires about their bodies next adjacent to members of the frame for fastening the filler to the frame.

28. In a machine of the character described, in combination, mechanism for fastening wires of a fabric filler to a gate frame comprising a plurality of rotatable toothed twisters, each twister including separable sections, housing for each twister including a movable section whereby to open and close the twisters, a rack bar common to all of the twisters, means for opening and closing the housings to effect separation of the sections of the twisters including means for selectively setting the sections of the twisters in open position, means for reciprocating the rack bar for actuating the twisters, and means for stopping and locking the movement of the rack bar upon a predetermined actuation of said bar.

29. In a machine of the character described, in combination, mechanism for fastening wires of a fabric filler to a frame, comprising a plurality of twisters, each twister including separable sections, one each of which is movable toward the other, selective means for predeterminately setting the twister sections in different opened positions, means for operating the twisters in unison, and means for predeterminately stopping and locking the twister operating means.

30. In combination, a twister assembly comprising a support, a rotatable toothed twister, said twister including separable sections, a housing for said twisters including a movable section forming a bearing for the movable section of the twisters, a pinion adapted for meshing and rotating said twisters, a rack bar for actuating the pinion, selective setting means for moving the movable section of the housing to effect the opening and closing of the twisters, and means for actuating said rack bar.

31. In combination, a twister assembly comprising a support, a rotatable toothed twister, said twister including separable sections, a housing for said twisters including a movable section forming a bearing for the movable section of the twisters, a pinion adapted for meshing and rotating said twisters, a rack bar for actuating the pinion, selective setting means for moving the movable section of the housing to effect the opening and closing of the twisters, means for actuating the rack bar, and means for predeterminately stopping and locking the rack bar against movement at a predetermined point in the rotation of the twister.

32. In a machine of the character described, in combination, mechanism for fastening a wire filler to a gate frame comprising a support, a series of twisters rotatably mounted on said support, means on the support for receiving the filler comprising a rock shaft and a plurality of stretcher members movable therewith, one stretcher member for each twister, a rest on the support for a member of a gate frame adapted to be placed in association with the filler and thereabove, means for wrapping ends of the filler wires about a member of the frame and for depositing the terminal ends of said wires in the twisters, said wrapping means comprising a rock shaft and a series of members thereon, one each to engage a wire in association with each twister, and means to rotate the twisters in unison for coiling the terminal ends of the wires about their bodies.

33. In a machine of the character described, in combination, mechanism for fastening a wire filler to a gate frame comprising a support, a series of twisters rotatably mounted on said support, means on the support for receiving the filler comprising a rock shaft and a plurality of stretcher members movable therewith, one stretcher member for each twister, a rest on the support for a member of a gate frame adapted to be placed in association with the filler and thereabove, means for wrapping ends of the filler wires about a member of the frame and for depositing the terminal ends of said wires in the twisters, said wrapping means comprising a rock shaft and a series of members thereon, one each to engage a wire in association with each twister, a wire cutting means associated with each twister, and means for rotating the twisters in unison and during such rotation cause the cutting off of any excess portions of said wires of the filler and for subsequently coiling the terminal ends of said wires about their bodies next adjacent to a member of the frame.

34. A twister for a machine of the character described, comprising separable toothed sections, each section having complementary axial recesses and complementary recesses eccentric to the axis of the sections, one section being provided with sets of spaced extended fingers and the other section having complementary recesses to receive said fingers and one of said sections being provided with a coiling pin.

In witness whereof, I have hereunto set my hand this 25th day of June, 1931.

GEORGE N. WILLIAMS.